US011629701B2

(12) United States Patent
Shen et al.

(10) Patent No.: US 11,629,701 B2
(45) Date of Patent: Apr. 18, 2023

(54) SYSTEM AND METHOD FOR ESTIMATING MOTOR TEMPERATURE OF A PITCH SYSTEM OF A WIND TURBINE

(71) Applicant: General Electric Company, Schenectady, NY (US)

(72) Inventors: Longhui Shen, Shanghai (CN); Chengjun Wang, Shanghai (CN)

(73) Assignee: General Electric Company, Schenectday, NY (US)

( * ) Notice: Subject to any disclaimer, the term of this patent is extended or adjusted under 35 U.S.C. 154(b) by 589 days.

(21) Appl. No.: 16/614,530

(22) PCT Filed: May 18, 2017

(86) PCT No.: PCT/CN2017/084941
§ 371 (c)(1),
(2) Date: Nov. 18, 2019

(87) PCT Pub. No.: WO2018/209655
PCT Pub. Date: Nov. 22, 2018

(65) Prior Publication Data
US 2020/0109700 A1     Apr. 9, 2020

(51) Int. Cl.
*F03D 17/00* (2016.01)
*F03D 7/02* (2006.01)
(Continued)

(52) U.S. Cl.
CPC ........... *F03D 17/00* (2016.05); *F03D 7/0224* (2013.01); *G01K 7/16* (2013.01); *G01K 13/08* (2013.01); *G08B 21/182* (2013.01); *G08B 29/14* (2013.01)

(58) Field of Classification Search
CPC ................ F03D 17/00; F05B 2260/821; F05B 2270/3032
See application file for complete search history.

(56) References Cited

U.S. PATENT DOCUMENTS 7,265,954 B2   9/2007   Hikawa et al.
8,766,577 B2   7/2014   Suzuki et al.
(Continued)

FOREIGN PATENT DOCUMENTS

CN        2874580 Y     2/2007
CN      101096941 A     1/2008
(Continued)

OTHER PUBLICATIONS

EPO Search Report, dated Dec. 15, 2020.
PCT International Search Report Corresponding to PCT/CN2017/084941 dated Feb. 22, 2018.

*Primary Examiner* — Sabbir Hasan
(74) *Attorney, Agent, or Firm* — Dority & Manning, P.A.

(57) ABSTRACT

A method for estimating a temperature of a motor of a pitch drive mechanism of a rotor blade of a wind turbine includes monitoring, via at least one sensor, an actual temperature and at least one additional operating condition of the motor during a normal operating period of the wind turbine. The method also includes storing, via a pitch controller, the monitored temperatures and the monitored additional operating conditions of the motor for the normal operating period. Further, the method includes determining a relationship between the monitored temperatures and the monitored additional operating conditions of the motor for the normal operating period. Thus, in the event that the sensor fails to (Continued)

operate, the method includes determining, via the pitch controller, an estimated temperature of the motor based on the relationship.

14 Claims, 7 Drawing Sheets

(51) Int. Cl.
  *G01K 7/16* (2006.01)
  *G01K 13/08* (2006.01)
  *G08B 21/18* (2006.01)
  *G08B 29/14* (2006.01)

(56) References Cited

U.S. PATENT DOCUMENTS

| | | | |
|---|---|---|---|
| 8,975,852 | B2 | 3/2015 | Petersson et al. |
| 8,977,401 | B2* | 3/2015 | Poulsen ............ F03D 7/044 290/55 |
| 9,062,653 | B2 | 6/2015 | Brath |
| 11,062,588 | B2* | 7/2021 | Galin ............ G08B 25/00 |

| | | |
|---|---|---|
| 2004/0119470 A1 | 6/2004 | Yajima et al. |
| 2008/0131279 A1 | 6/2008 | Behnke et al. |
| 2014/0112369 A1 | 4/2014 | Senoo |
| 2015/0008858 A1 | 1/2015 | Oh |
| 2015/0303860 A1 | 10/2015 | Imanishi et al. |
| 2017/0160727 A1* | 6/2017 | Ishikawa ............ G05B 19/4184 |

FOREIGN PATENT DOCUMENTS

| | | |
|---|---|---|
| CN | 102330645 A | 1/2012 |
| CN | 102549910 A | 7/2012 |
| CN | 102916643 A | 2/2013 |
| CN | 102312772 B | 6/2013 |
| CN | 102721924 B | 7/2014 |
| CN | 104823370 A | 8/2015 |
| CN | 105134510 A | 12/2015 |
| CN | 103758696 B | 5/2016 |
| CN | 106 050 562 A | 10/2016 |
| EP | 2 928 050 A1 | 10/2015 |
| JP | 3180372 U | 12/2012 |
| WO | WO-2012007194 A2 * | 1/2012 ............ F03D 7/0224 |
| WO | WO2016/181898 A1 | 11/2016 |
| WO | WO-2016206692 A1 * | 12/2016 ............ F03D 17/00 |

* cited by examiner

SYSTEM AND METHOD FOR ESTIMATING MOTOR TEMPERATURE OF A PITCH SYSTEM OF A WIND TURBINE

FIELD OF THE INVENTION

The present disclosure relates generally to wind turbines, and more particularly to systems and methods for estimating motor temperature of a pitch system of a wind turbine, e.g. when the standard motor temperature sensor fails.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation, the direction of the wind which powers the wind turbine may change. The wind turbine may thus adjust the nacelle through, for example, a yaw adjustment about a longitudinal axis of the tower to maintain alignment with the wind direction. In addition, the wind turbine may adjust a pitch angle of one or more of the rotor blades via a pitch drive mechanism configured with a pitch bearing of the respective rotor blade to change the angle of the blade with respect to the wind.

Typical pitch drive mechanisms include pitch drive motor, a pitch drive gearbox, and a pitch drive pinion. In many instances, the pitch drive motor is a direct current (DC) compound motor having, at least, an armature and a shunt field winding. The pitch drive motor is coupled to the pitch drive gearbox so that the pitch drive motor imparts mechanical force to the pitch drive gearbox. Similarly, the pitch drive gearbox may be coupled to the pitch drive pinion for rotation therewith. The pitch drive pinion may, in turn, be in rotational engagement with the pitch bearing coupled between the hub and a corresponding rotor blade such that rotation of the pitch drive pinion causes rotation of the pitch bearing. Thus, in such embodiments, rotation of the pitch drive motor drives the pitch drive gearbox and the pitch drive pinion, thereby rotating the pitch bearing and the rotor blade about the pitch axis.

The shunt field winding of the pitch drive motor is typically the most temperature sensitive component thereof. Thus, typical pitch drive motors include a resistance temperature device (RTD) for monitoring the temperature of the shunt field winding. During normal operation, the pitch controller receives temperature signals from the RTD and trips the pitch system when the pitch drive motor is over temperature. If the RTD fails, the pitch controller trips the pitch system due to abnormal motor temperature, eventually causing the entire wind turbine to shut down. Though the RTDs are inexpensive, tripping the wind turbine is not.

As such, a system and method that addresses the aforementioned issues would be desired. Accordingly, the present disclosure is directed to systems and methods for estimating motor temperature of a pitch system of a wind turbine, e.g. when the RTD sensor fails.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for estimating a temperature of a motor of a pitch drive mechanism of a rotor blade of a wind turbine. The method includes monitoring, via at least one sensor, an actual temperature and at least one additional operating condition of the motor during a normal operating period of the wind turbine. The method also includes storing, via a pitch controller, the monitored temperatures and the monitored additional operating conditions of the motor for the normal operating period. Further, the method includes determining a relationship between the monitored temperatures and the monitored additional operating conditions of the motor for the normal operating period. Thus, in the event that the sensor fails to operate, the method includes determining, via the pitch controller, an estimated temperature of the motor based on the relationship. For example, the sensor failing to operate may be caused by a fault or short, or an open switch.

In one embodiment, the actual temperature and the estimated temperature of the motor may each represent a shunt field temperature of a shunt field winding of the motor. In another embodiment, the additional operating condition(s) of the motor may include a shunt field resistance, a shunt field current, a shunt field voltage, an armature current, an armature voltage, a motor speed, or similar, and/or combinations thereof.

In further embodiments, the step of determining the relationship between the monitored temperatures and the monitored resistances of the motor for the normal operating period may include performing, via the pitch controller, a statistical analysis on the monitored temperatures and the monitored resistances of the motor for the normal operating period. For example, in one embodiment, the statistical analysis may include a regression analysis.

In additional embodiments, the step of determining the relationship between the monitored temperatures and the monitored additional operating conditions of the motor for the normal operating period may include determining, via machine learning, the relationship between the monitored temperatures and the monitored additional operating conditions of the motor for the normal operating period for multiple power cycles until a predetermined temperature rise of the motor is reached. More specifically, in certain embodiments, the predetermined temperature rise may include from about twenty (20) degrees to about sixty (60) degrees, such as about fifty (50) degrees.

In several embodiments, the method may further include generating a transfer function between the monitored temperatures and the monitored additional operating conditions of the motor for the normal operating period, and determining the estimated temperature of the motor based on the transfer function if the sensor fails. In particular embodiments, the method may also include updating the transfer function during the normal operating period of the wind turbine.

In yet another embodiment, the method may include generating an alarm signal in the event that the sensor fails to operate.

In another aspect, the present disclosure is directed to a pitch system for a wind turbine. The pitch system includes a pitch drive motor having an armature and a shunt field winding, at least one sensor configured for monitoring an actual temperature and at least one additional operating condition of the shunt field winding during a normal operating period of the wind turbine, a converter communicatively coupled to the pitch dive motor so as to drive the armature, and a pitch controller communicatively coupled to the at least one sensor. The pitch controller includes at least one processor configured to perform one or more operations, including but not limited to, storing the monitored temperatures and the monitored additional operating conditions of the motor for the normal operating period, determining a relationship between the monitored temperatures and the monitored additional operating conditions of the motor for the normal operating period, and in the event that the sensor fails to operate, determining an estimated temperature of the motor based on the relationship.

In one embodiment, the sensor(s) may include a resistance temperature detector (RTD). In addition, it should be understood that the pitch system may be further configured with any of the additional features and/or embodiments described herein.

In yet another aspect, the present disclosure is directed to a method for estimating a temperature of a motor of a pitch drive mechanism of a rotor blade of a wind turbine. The method includes initially storing a transfer function in a pitch controller of the pitch drive mechanism relating at least one actual temperature of the motor with at least one operating conditions of the motor for a normal operating period. In the event that a sensor of a motor of the pitch drive mechanism fails to operate, the method further includes determining, via the pitch controller, an estimated temperature of the motor based on the transfer function.

In one embodiment, the method further includes comparing the estimated temperature with a present temperature limit of the motor and determining an accuracy of the transfer function based on the comparison.

In another embodiment, the method may further include updating the transfer function if the accuracy is above a predetermined threshold or generating an alarm signal if the accuracy is below a predetermined threshold. In addition, it should be understood that the method may be further configured with any of the additional steps, features and/or embodiments described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
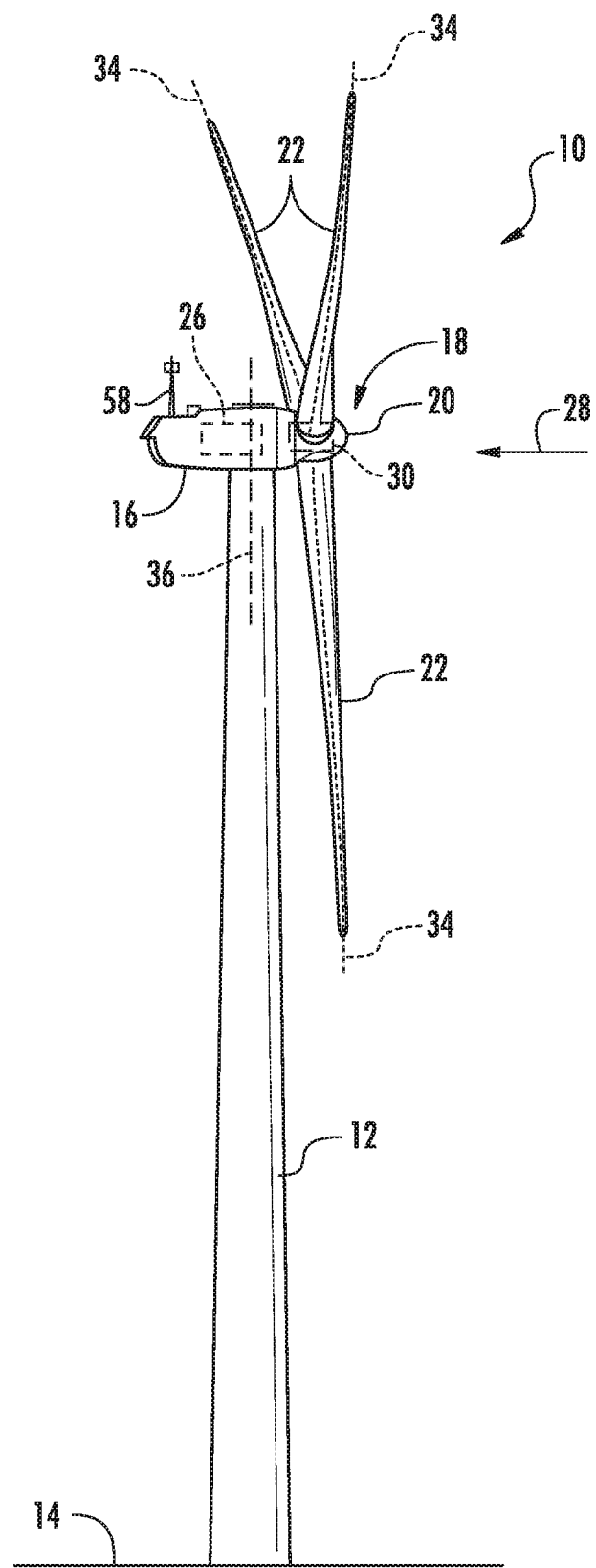
FIG. 1 illustrates a perspective view of a wind turbine according to one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
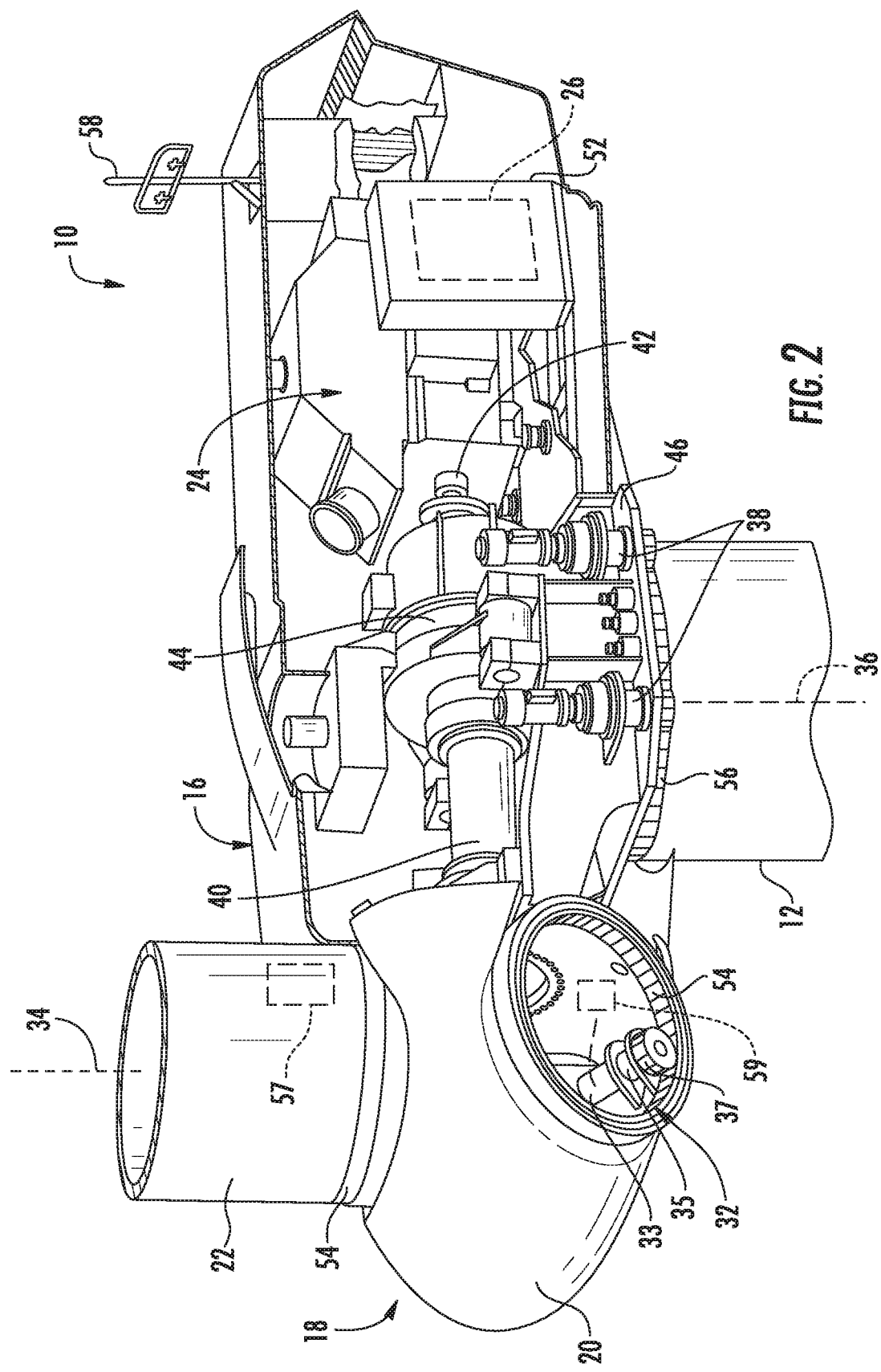
FIG. 2 illustrates a perspective, internal view of a nacelle of a wind turbine according to one embodiment of the present disclosure.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main shaft 40 coupled to the hub 20 for rotation therewith. The generator 24 may then be coupled to the main shaft 40 such that rotation of the main shaft 40 drives the generator 24. For instance, in the illustrated embodiment, the generator 24 includes a generator shaft 42 rotatably coupled to the main shaft 40 through a gearbox 44. However, in other embodiments, it should be appreciated that the generator shaft 42 may be rotatably coupled directly to the main shaft 40. Alternatively, the generator 24 may be directly rotatably coupled to the main shaft 40.

It should be appreciated that the main shaft 40 may generally be supported within the nacelle 16 by a support frame or bedplate 46 positioned atop the wind turbine tower 12. For example, the main shaft 40 may be supported by the bedplate 46 via a pair of pillow blocks 48, 50 mounted to the bedplate 46.

As shown in FIGS. 1 and 2, the wind turbine 10 may also include a turbine control system or a turbine controller 26 within the nacelle 16. For example, as shown in FIG. 2, the turbine controller 26 is disposed within a control cabinet 52 mounted to a portion of the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10.

Each rotor blade 22 may also include a pitch adjustment mechanism 32 configured to rotate each rotor blade 22 about its pitch axis 34. Further, each pitch adjustment mechanism 32 may include a pitch drive motor 33 (e.g., any suitable electric, hydraulic, or pneumatic motor), a pitch drive gearbox 35, and a pitch drive pinion 37. In such embodiments, the pitch drive motor 33 may be coupled to the pitch drive gearbox 35 so that the pitch drive motor 33 imparts mechanical force to the pitch drive gearbox 35. Similarly, the pitch drive gearbox 35 may be coupled to the pitch drive pinion 37 for rotation therewith. The pitch drive pinion 37 may, in turn, be in rotational engagement with a pitch bearing 54 coupled between the hub 20 and a corresponding rotor blade 22 such that rotation of the pitch drive pinion 37 causes rotation of the pitch bearing 54. Thus, in such embodiments, rotation of the pitch drive motor 33 drives the pitch drive gearbox 35 and the pitch drive pinion 37, thereby rotating the pitch bearing 54 and the rotor blade 22 about the pitch axis 34. Similarly, the wind turbine 10 may include one or more yaw drive mechanisms 38 communicatively coupled to the controller 26, with each yaw drive mechanism(s) 38 being configured to change the angle of the nacelle 16 relative to the wind (e.g., by engaging a yaw bearing 56 of the wind turbine 10).

Further, the turbine controller 26 may also be communicatively coupled to each pitch adjustment mechanism 32 of the wind turbine 10 (one of which is shown) through a separate or integral pitch controller 30 (FIG. 1) for controlling and/or altering the pitch angle of the rotor blades 22 (i.e., an angle that determines a perspective of the rotor blades 22 with respect to the direction 28 of the wind).

In addition, as shown in FIG. 2, one or more sensors 57, 58, 59 may be provided on the wind turbine 10. More specifically, as shown, a blade sensor 57 may be configured with one or more of the rotor blades 22 to monitor the rotor blades 22. Further, as shown, a wind sensor 58 may be provided on the wind turbine 10. For example, the wind sensor 58 may a wind vane, and anemometer, a LIDAR sensor, or another suitable sensor that measures wind speed and/or direction. In addition, a pitch sensor 59 may be configured with each of the pitch drive mechanism 32, e.g. with one or more batteries of the pitch drive motors 33 thereof, which will be discussed in more detail below. As such, the sensors 57, 58, 59 may further be in communication with the controller 26, and may provide related information to the controller 26. For example, the pitch sensor(s) 59 may correspond to temperature sensors that send temperature signals to the controllers 26, 30 to indicate a temperature of the pitch batteries, which is described in more detail herein.

It should also be appreciated that, as used herein, the term "monitor" and variations thereof indicates that the various sensors of the wind turbine 10 may be configured to provide a direct measurement of the parameters being monitored and/or an indirect measurement of such parameters. Thus, the sensors described herein may, for example, be used to generate signals relating to the parameter being monitored, which can then be utilized by the controller 26 to determine the condition.

Figure 3:
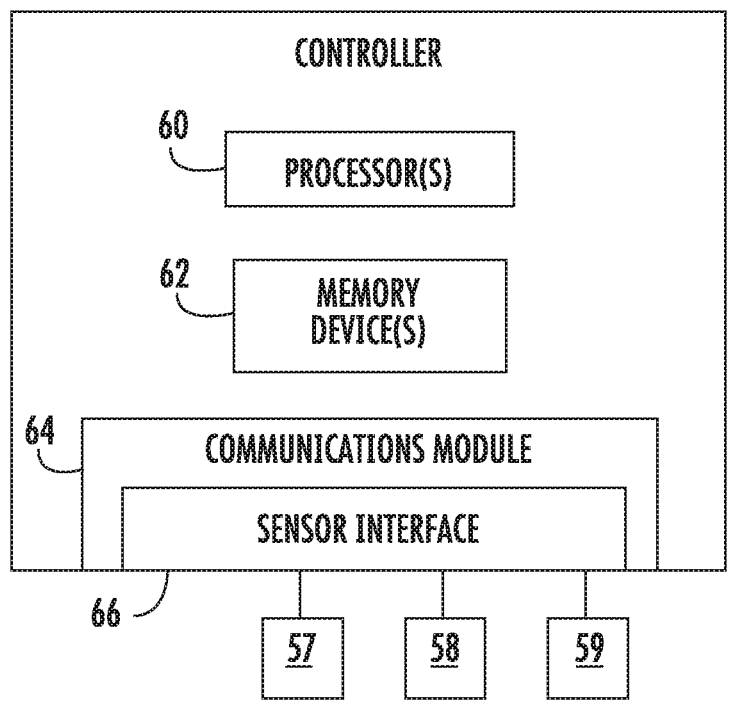
FIG. 3 illustrates a schematic diagram of one embodiment of suitable components that may be included in a wind turbine controller according to the present disclosure.

Referring now to FIG. 3, there is illustrated a block diagram of one embodiment of suitable components that may be included within the controller 26 (or the pitch controller 30) according to the present disclosure. As shown, the controller 26, 30 may include one or more processor(s) 60 and associated memory device(s) 62 configured to perform a variety of computer-implemented functions (e.g., performing the methods, steps, calculations and the like and storing relevant data as disclosed herein). Additionally, the controller 26, 30 may also include a communications module 64 to facilitate communications between the controller 26, 30 and the various components of the wind turbine 10. Further, the communications module 64 may include a sensor interface 66 (e.g., one or more analog-to-digital converters) to permit signals transmitted from one or more sensors 57, 58, 59 to be converted into signals that can be understood and processed by the processors 60. It should be appreciated that the sensors 57, 58, 59 may be communicatively coupled to the communications module 64 using any suitable means. For example, as shown in FIG. 3, the sensors 57, 58, 59 are coupled to the sensor interface 66 via a wired connection. However, in other embodiments, the sensors 57, 58, 59 may be coupled to the sensor interface 66 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 62 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the controller 26 to perform various functions including, but not limited to, transmitting suitable control signals to implement corrective action(s) in response to a distance signal exceeding a predetermined threshold as described herein, as well as various other suitable computer-implemented functions.

Figure 4:
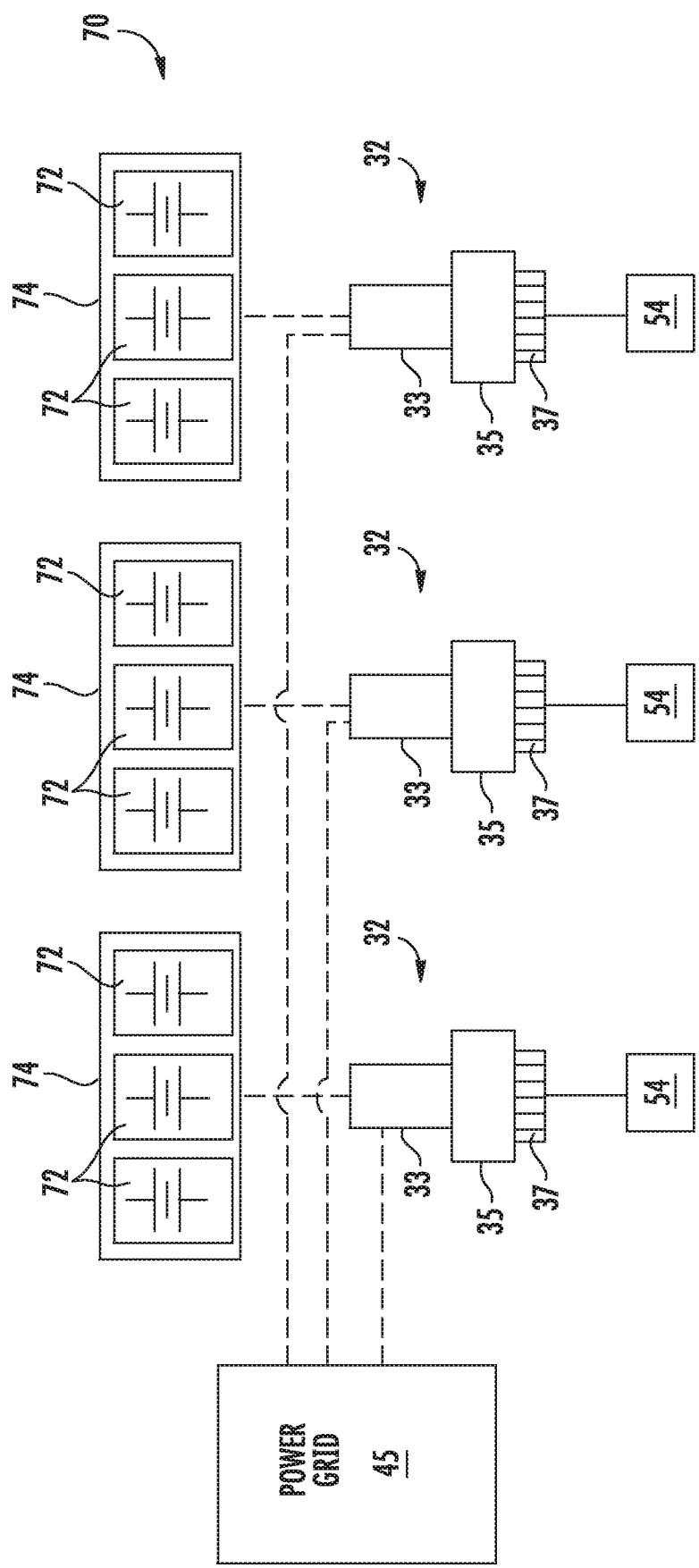
FIG. 4 illustrates a schematic diagram of one embodiment of a pitch system of a wind turbine according to the present disclosure.

Referring now to FIG. 4, a schematic diagram of one embodiment an overall pitch system 70 for the wind turbine 10 is illustrated. More specifically, as shown, the pitch system 70 may include a plurality of pitch drive mechanisms 32, i.e. one for each pitch axis 34 so as to rotate respective pitch bearings 54. Further, as shown, each of the pitch drive mechanisms may be communicatively coupled to the power grid 45 as well as one or more backup batteries 72. More specifically, as shown, each pitch drive mechanism 32 may include a plurality of backup batteries 72 stored in a battery cabinet 74. During normal operation of the wind turbine 10, the pitch drive motors 33 are driven by the power grid 45.

However, in some instances, such as during an adverse grid event or grid loss, the pitch drive motors 33 may be driven by one or more backup batteries 72.

Figure 5:
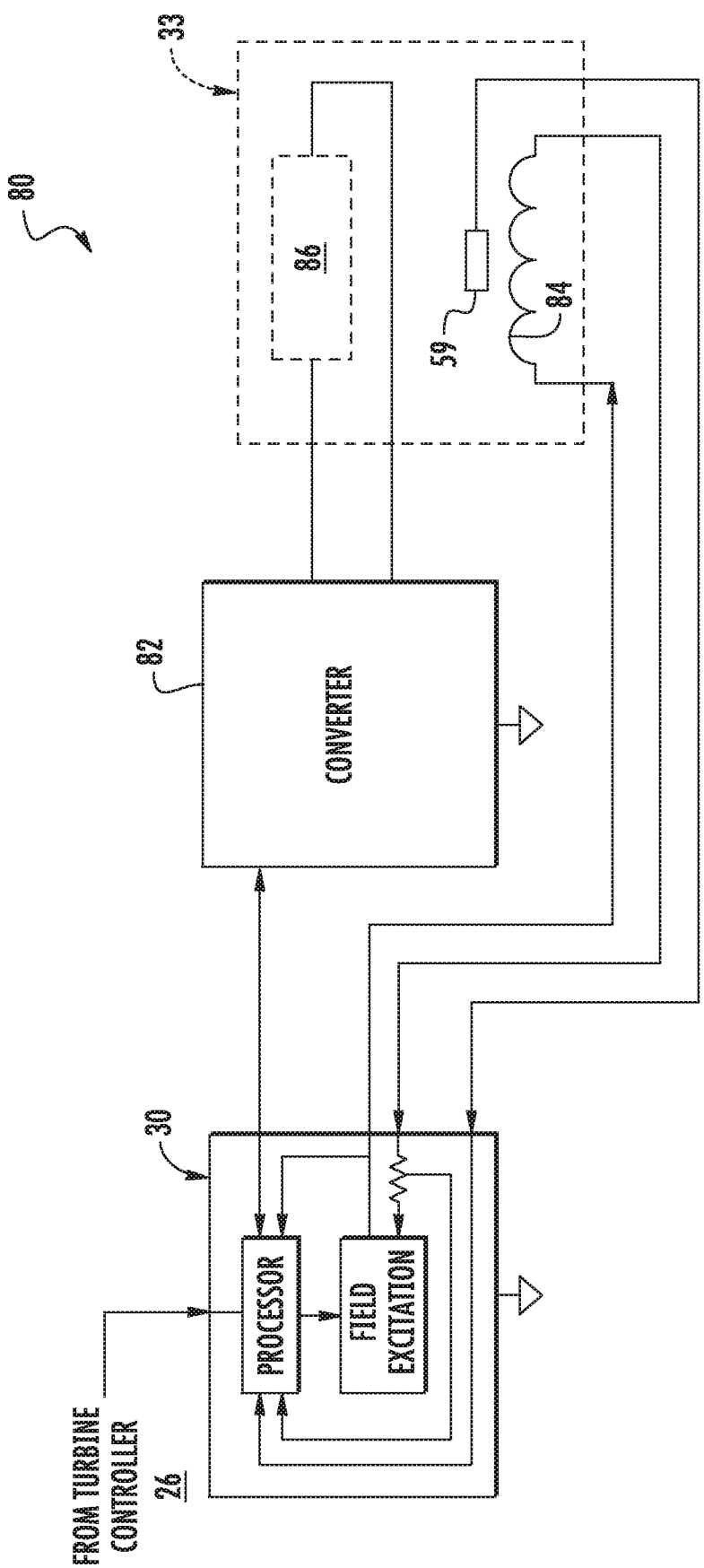
FIG. 5 illustrates a schematic diagram of one embodiment of a pitch drive motor of a pitch system of a wind turbine according to the present disclosure.

Referring now to FIG. 5, a schematic diagram of one embodiment of a control circuit 80 for controlling one of the rotor blades 22 of the present disclosure is illustrated. As shown, the control circuit 80 includes the pitch drive motor 33, a converter 82 for driving the motor 33, and the pitch controller 30 for controlling the circuit 80. More specifically, the pitch drive motor 33 is a compound direct-current (DC) motor that includes an armature 86 and a shunt field winding 84 or coil. In addition, as shown, the pitch controller 30 may receive one or more control signals from the turbine controller 26 and operate the pitch drive motor(s) 33 accordingly.

In a compound DC motor, the shunt field winding 84 is generally the most temperature sensitive part in the motor. Thus, the control circuit 80 typically includes a temperature sensor 59 in or near the shunt field winding 84 so as to monitor the temperature thereof. Accordingly, during normal operation, the pitch controller 30 senses a temperature of the motor 33 (i.e. the shunt field winding 84) using the temperature sensor 59. As such, the pitch controller 30 is configured to trip when the sensed temperature exceeds a predetermined threshold that is indicative of an over-temperature condition. In one embodiment, the temperature sensor 59 may be a resistance temperature device (RTD). If the temperature sensor 59 fails, which can be a common failure mode, the pitch controller 30 also trips due to sensing an abnormal motor temperature, eventually causing the wind turbine 10 to shut down.

Figure 6:
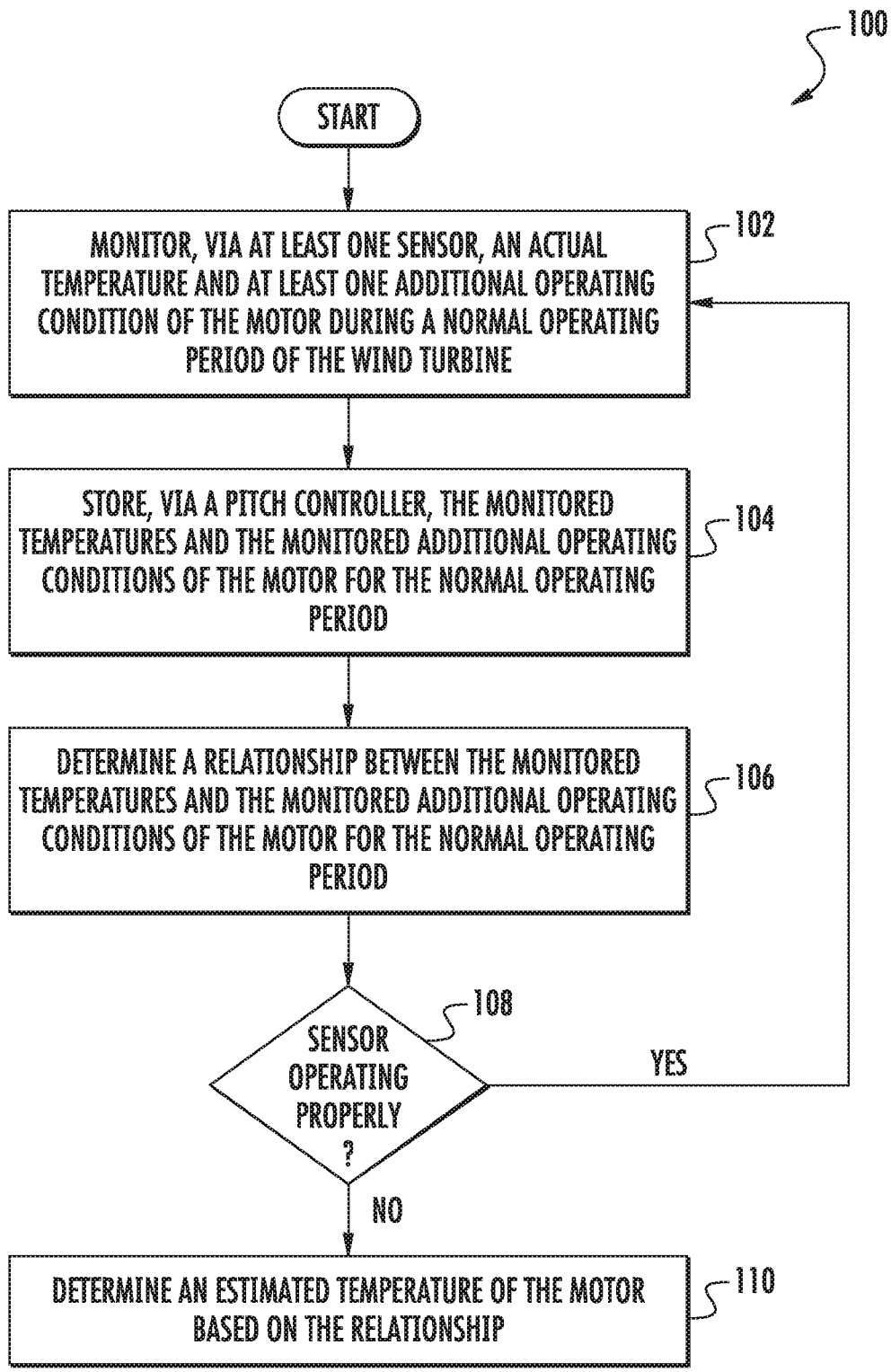
FIG. 6 illustrates a flow diagram of one embodiment of a method for estimating a temperature of a motor of a pitch drive mechanism of a rotor blade of a wind turbine according to the present disclosure.

Thus, the present disclosure is directed to systems and methods for predicting the motor temperature by learning the relationship between the shunt field resistance and its temperature when the temperature sensor 59 is working properly and using the temperature prediction when the temperature sensor 59 fails so as to reduce turbine down time. More specifically, as shown in FIG. 6, a flow diagram of one embodiment of a method 100 for estimating the temperature of a motor 33 of the pitch drive mechanism 32 of one of the rotor blades 22 of the wind turbine 10 is illustrated. As shown at 102, the method 100 monitoring an actual temperature of the motor 33 via the temperature sensor 59 and at least one additional operating condition of the motor 33 during a normal operating period of the wind turbine 10. For example, as shown, the actual temperature of the motor 33 is representative of the temperature of the shunt field temperature of the shunt field winding 84 of the motor 33. Further, the additional operating condition(s) of the motor 33 may include a shunt field resistance, a shunt field current, a shunt field voltage, an armature current, an armature voltage, a motor speed, or similar, and/or combinations thereof.

Referring still to FIG. 6, as shown at 104, the method 100 includes storing, via the pitch controller 30, the monitored temperatures and the monitored additional operating conditions of the motor 33 for the normal operating period. As shown at 106, the method 100 includes determining a relationship between the monitored temperatures and the monitored additional operating conditions of the motor 33 for the normal operating period. More specifically, in certain embodiments, the pitch controller 30 may perform a statistical analysis on the monitored temperatures and the monitored resistances of the motor 33 for the normal operating period. For example, in one embodiment, the statistical analysis may include a regression analysis. Alternatively, it should be understood that any further statistical analysis may also be performed on the monitored temperatures and the monitored resistances of the motor 33 for the normal operating period.

In additional embodiments, the pitch controller 30 may determine the relationship between the monitored temperatures and the monitored additional operating conditions of the motor 33 for the normal operating period via machine learning. Further, the pitch controller 30 may determine the relationship between the monitored temperatures and the monitored additional operating conditions of the motor for the normal operating period for multiple power cycles until a predetermined temperature rise of the motor is reached. More specifically, in certain embodiments, the predetermined temperature rise may include from about twenty (20) degrees to about sixty (60) degrees, such as about fifty (50) degrees.

In several embodiments, the pitch controller 30 may also be configured to generate a transfer function between the monitored temperatures and the monitored additional operating conditions of the motor 33 for the normal operating period. In such embodiments, the controller 30 is further configured to determine the estimated temperature of the motor 33 based on the transfer function, e.g. if the sensor 59 fails. In additional embodiments, the pitch controller 30 may also update the transfer function during the normal operating period of the wind turbine 10.

Thus, as shown at 108, the pitch controller 30 determines whether the temperature sensor 59 is operating properly. Accordingly, as shown at 110, in the event that the sensor fails to operate 59, the pitch controller 30 is configured to determine an estimated temperature of the motor 33 based on the relationship described above. For example, in one embodiment, the estimated temperature of the motor 33 may each represent an estimated temperature of the shunt field winding 84 of the motor 33. As described herein, the sensor failing to operate may be caused by a fault or short, an open switch, or any other sensor issue to cause the sensor 59 to not function or operate properly. In one embodiment, the pitch controller 30 may generate an alarm signal in the event that the temperature sensor 59 fails to operate.

Figure 7:
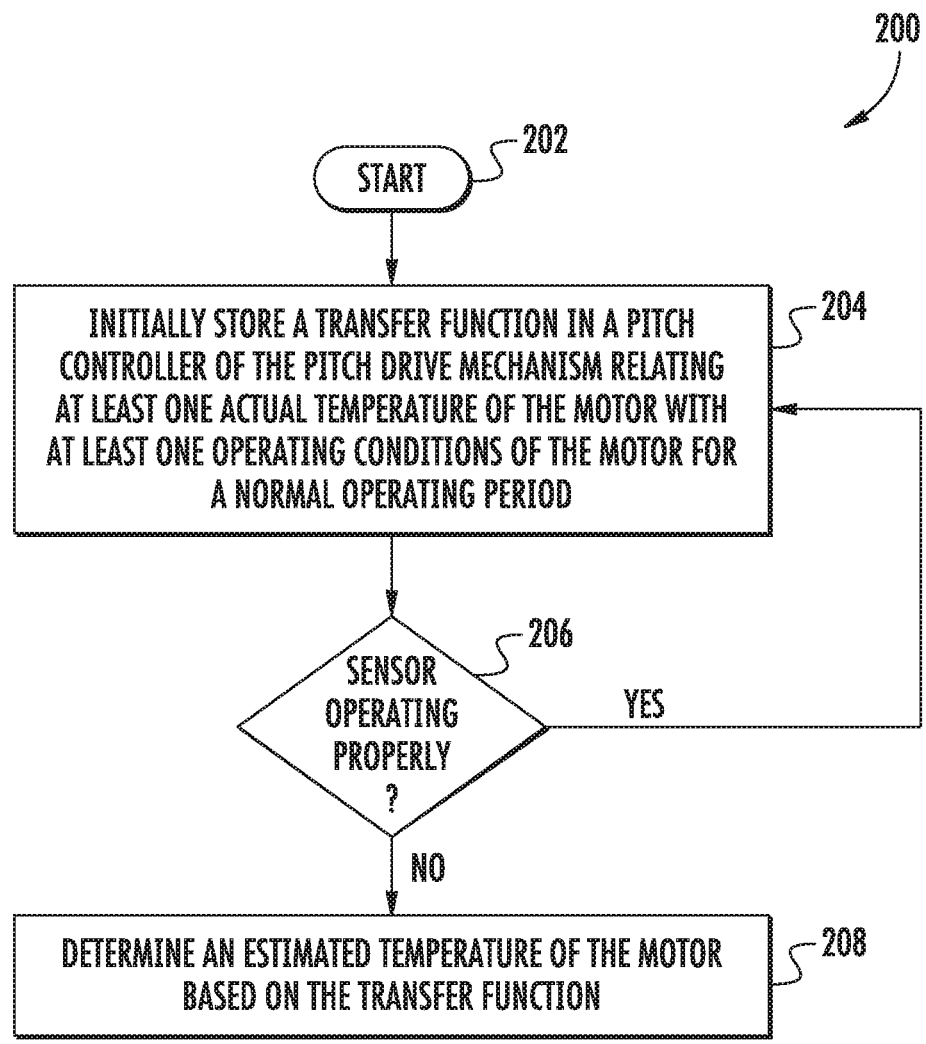
FIG. 7 illustrates a flow diagram of another embodiment of a method for estimating a temperature of a motor of a pitch drive mechanism of a rotor blade of a wind turbine according to the present disclosure.

Referring now to FIG. 7, a flow diagram of another embodiment of a method 200 for estimating the motor temperature of the pitch drive motor 33 is illustrated. As shown at 202, the method 200 starts. As shown at 204, the method 200 includes initially storing a transfer function in a pitch controller of the pitch drive mechanism relating at least one actual temperature of the motor with at least one operating conditions of the motor for a normal operating period. As shown at 206, the method 200 includes determining whether the sensor is operating properly or not. In the event that the temperature sensor 59 fails to operate, as shown at 208, the method 200 includes determining, via the pitch controller 30, an estimated temperature of the motor 33 based on the transfer function.

In one embodiment, the method 200 further includes comparing the estimated temperature with a present temperature limit of the motor and determining an accuracy of the transfer function based on the comparison. In another embodiment, the method 200 may further include updating the transfer function if the accuracy is above a predetermined threshold or generating an alarm signal if the accuracy is below a predetermined threshold.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for estimating a temperature of a motor of a pitch drive mechanism of a rotor blade of a wind turbine, the method comprising:
monitoring, via at least one sensor, an actual temperature of the motor during a normal operating petiod of the wind turbine;
monitoring a parameter of at least one additional operating condition of the motor during the normal operating period;
storing and updating, via a pitch controller, the monitored temperatures and the monitored parameters of the additional operating conditions of the motor for the normal operating period;
determining a relationship between the updated monitored temperatures and the updated monitored parameters of the additional operating conditions of the motor for the normal operating period; and,
upon failure of the sensor to operate, determining, via the pitch controller, an estimated temperature of the motor based on the relationship determined during the normal operating period based on the updated monitored temperatures and updated monitored parameters preceding the failure.

2. The method of claim 1, wherein the actual temperature and the estimated temperature of the motor each represent a shunt field temperature of a shunt field winding of the motor.

3. The method of claim 1, wherein the at least one additional operating condition of the motor comprises at least one of a shunt field resistance, a shunt field current, a shunt field voltage, an armature current, an armature voltage, a motor speed, or combinations thereof.

4. The method of claim 1, wherein determining the relationship between the monitored temperatures and the monitored parameters of the additional operating conditions of the motor for the normal operating period further comprises:
performing, via the pitch controller, a statistical analysis on the monitored temperatures and the monitored parameters of the additional operating conditions of the motor for the normal operating period.

5. The method of claim 4, wherein the statistical analysis comprises a regression analysis.

6. The method of claim 1, wherein determining the relationship between the monitored temperatures and the monitored parameters of the additional operating conditions of the motor for the normal operating period further comprises:
determining, via machine learning, the relationship between the monitored temperatures and the monitored parameters of the additional operating conditions of the motor for the normal operating period for multiple power cycles until a predetermined temperature rise of the motor is reached.

7. The method of claim I, further comprising:
generating a transfer function between the monitored temperatures and the monitored parameters of the additional operating conditions of the motor for the normal operating period; and
determining, via the pitch controller, the estimated temperature of the motor based on the transfer function if the sensor fails.

8. The method of claim 7, further comprising updating the transfer function during the normal operating period of the wind turbine.

9. The method of claim 1, wherein the sensor failing to operate is caused by at least one of a fault or an open switch.

10. The method of claim 1, further comprising generating, via the pitch controller. an alarm signal in the event that the sensor fails to operate.

11. A pitch system for a wind turbine, the pitch system cornprising:
a pitch drive motor comprising an armature and a shunt field winding;
at least one sensor configured for monitoring an actual temperature of the shunt field winding during a normal operating period of the wind turbine;
a converter communicatively coupled to the pitch dive motor so as to drive the armature; and,
a pitch controller communicatively coupled to the at least one sensor, the pitch controller comprising at least one processor configured to perform the following operations:
storing and updating the monitored temperatures and the monitored additional operating conditions of the shunt filed winding of the motor for the normal operating period;
storing updated monitored parameters of an additional operatin condition of the motor during the normal operating period;
determining a relationship between the monitored temperatures and the monitored parameters of the additional operating conditions of the motor for the normal operating period; and,
upon failure of the sensor to operate, determining an estimated temperature of the motor based on the relationship determined during the normal operating period based on the updated monitored temperatures and updated monitored parameters preceding the failure.

12. The system of claim 11, wherein the at least one sensor comprises a resistance temperature detector (RTD).

13. The system of claim 11, wherein the actual temperature and the estimated temperature of the motor each represent a shunt field temperature of a shunt field winding of the motor.

14. The system of claim 11, wherein the additional operating condition of the motor comprises at least one of a shunt field resistance, a shunt field current, a shunt field voltage, an armature current, an armature voltage, a motor speed, or combinations thereof.

* * * * *